(12) United States Patent
Pisila et al.

(10) Patent No.: US 9,777,668 B2
(45) Date of Patent: Oct. 3, 2017

(54) PISTON FOR LARGE SIZED INTERNAL COMBUSTION ENGINE

(75) Inventors: Sakari Pisila, Kokkola (FI); Tommy Ronnskog, Jakobstad (FI)

(73) Assignee: COMPONENTA FINLAND OY, Karkkila (FI)

( * ) Notice: Subject to any disclaimer, the term of this patent is extended or adjusted under 35 U.S.C. 154(b) by 350 days.

(21) Appl. No.: 14/368,813

(22) PCT Filed: Dec. 30, 2011

(86) PCT No.: PCT/FI2011/051169
§ 371 (c)(1),
(2), (4) Date: Oct. 1, 2014

(87) PCT Pub. No.: WO2013/098464
PCT Pub. Date: Jul. 4, 2013

(65) Prior Publication Data
US 2015/0068486 A1    Mar. 12, 2015

(51) Int. Cl.
*F02F 3/00* (2006.01)
*B23P 15/10* (2006.01)
*B21K 1/44* (2006.01)

(52) U.S. Cl.
CPC ............ *F02F 3/0069* (2013.01); *B23P 15/10* (2013.01); *F02F 3/0023* (2013.01); *F05C 2201/021* (2013.01)

(58) Field of Classification Search
CPC ........ F05C 2201/021; F05C 2201/0448; F02F 3/22; F02F 2200/06; F02F 3/0069;
(Continued)

(56) References Cited

U.S. PATENT DOCUMENTS 1,403,917 A    1/1922  Rowan
6,684,844 B1 *  2/2004 Wang .................... F02F 3/00
                                                        123/193.1
(Continued)

FOREIGN PATENT DOCUMENTS

JP    56 156944    11/1981
JP    58 064843     5/1983
(Continued)

OTHER PUBLICATIONS

International Search Report dated Oct. 1, 2012, in corresponding PCT application.
(Continued)

*Primary Examiner* — Syed O Hasan
(74) *Attorney, Agent, or Firm* — Young & Thompson

(57) ABSTRACT

A piston for internal combustion diesel engine having a piston diameter of 180 to 650 mm, includes a top part and a body part connectable to each other, the top part defining, when installed in a cylinder of the engine, the piston side of a combustion chamber, and the body part having an aperture for a gudgeon pin, bosses for distributing forces, when in use, between the piston and the gudgeon pin, the body part having an interior, an outer surface and operable connecting surfaces. The interior of the body part includes an interior wall having a macro geometry of wavy surface, where a wave has a length of 3 to 25 mm and a height of 0.3 to 3 mm, the wavy surface having a micro geometry measurable as a surface roughness of 5 to 9 μm.

17 Claims, 4 Drawing Sheets

(58) Field of Classification Search
CPC . F02F 3/0023; B23P 15/10; B21K 1/18; F16J 1/16
USPC ............ 123/193.6, 193.1; 29/888.04, 888.05
See application file for complete search history.

(56) References Cited

U.S. PATENT DOCUMENTS

2007/0113802 A1* 5/2007 Mihara .................... F02F 3/12
                                                    123/41.35
2011/0073061 A1* 3/2011 Chae ..................... F02F 3/0076
                                                    123/193.6

FOREIGN PATENT DOCUMENTS

| RU | 1716185 | * | 2/1992 |
| SU | 1 716 185 | | 2/1992 |
| WO | 2005-066481 | | 7/2005 |

OTHER PUBLICATIONS

JP Office Action, dated Oct. 23, 2015; Application No. 2014-549506.

* cited by examiner

PISTON FOR LARGE SIZED INTERNAL COMBUSTION ENGINE

BACKGROUND OF THE INVENTION

Field of the Invention

This invention relates to a piston for internal combustion diesel engine having a piston diameter of 180 to 650 mm, the piston comprising a top part and a body part connectable to each others, the top part defining, when installed in a cylinder of the engine, the piston side of a combustion chamber, and the body part having an aperture for a gudgeon pin, bosses for distributing forces, when in use, between the piston and the gudgeon pin, the body part having an interior, an outer surface and operable connecting surfaces.

Description of the Related Art

Large internal combustion engines are widely used in demanding power supply tasks in electric power plants, as a power source of ship propulsion systems, etc.

In large internal combustion engines there is an increasing demand in having more power out of the engine with the same cylinder displacement. The aim is to increase the power rate and simultaneously decrease emissions caused by the engine. One route towards these results is the increase in cylinder pressure when in operation. On the other hand the reliability of these large engines must also improve i.e. any failures in operation are highly unwanted. This causes development needs to all parts of these engines, pistons included.

BRIEF SUMMARY OF THE INVENTION

The objective of the present invention is to provide a piston for large size internal combustion diesel engines, having a piston diameter in a range of 180 mm to 650 mm. The objective of the invention is to provide a piston, which can withstand increased cylinder pressures in operation for long periods of time.

Especially the ability to withstand fatigue at elevated power rates of the internal combustion diesel engine is one objective of the present invention. While having a challenging technical task of developing a piston for these increased demands, also the economical side of the piston production need to be taken account. A piston is preferably manufactured in such a way that a unit price for one piston is not too high. Therefore a balance of manufacturing costs and technical excellence must be taken in to consideration. At current markets for large sized piston, it is still a product which should not be too expensive and at the same time technically as imperceptible as possible, just working the whole life time of the engine without causing any troubles.

The present invention is characterized in that the interior of the body part comprises an interior wall (or surface) having a macro geometry of wavy surface, where a length of a wave is 3 to 25 mm and a height of a wave is 0.3 to 3 mm, the wavy surface having an isotropic micro geometry measurable as a surface roughness of 5 to 9 μm. Here the surface roughness is measured as $R_a$ i.e. arithmetic average of surface roughness.

A piston having this kind of internal geometry the applicant has noticed that there is significant increase in fatigue resistance compared to conventional large sized pistons having cast or forged surface and still the manufacturing costs are able to keep at reasonable level. The piston having the claimed geometry responses to fatigue conditions in such a way that the combination of macro geometry and micro geometry practically eliminates those spots where an initial crack may start to develop in conventional pistons.

According to one preferred embodiment, the wavy surface is directed in the interior wall such that a crest of the wave is in an axial direction of the piston. This enables good solid structure while the manufacturing is probably among the least complicated.

According to one embodiment, the macro geometry is formed so that by the bosses, a crest of the wave point to a dome or domes of the interior. In other words, a crest of the wave runs towards the dome or domes of the interior of the body part. This feature enables geometrically even or radially symmetrical geometry which converges towards the dome of the interior. This feature has an effect that it helps to prevent those stress consentrations, which may serve as an initial spot of fatigue crack.

According to an embodiment of the invention, a surface pattern of the micro geometry is isotropic. This means that the surface of the body part interior comprises a pattern, which is substantially similar in both directions of the plane of surface. This isotropic surface pattern is obtainable for example by shot peening or shot blasting. The effect of this feature is to make the surface even so that there are no orientated markings caused by previous manufacturing phases such as the milling of macro geometry may cause. In addition, those mentioned methods cause a significant compressive stress to the very surface of the interior of the body part and therefore also effecting positively to the fatigue resistance of the piston. Thus, according to an embodiment of the invention, the interior wall of the body part comprises a surface layer having compressive stress.

Definitions

In this context the operable connection surface means a surface of the piston which surface is in contact or in interrelated interaction with an other part of the piston or the itself engine. For example, a surface of gudgeon pin aperture which touches the gudgeon pin, when installed is an operable connecting surface. Also, the outside of the body part, the sleeve part which slides in small clearance and separated by a thin oil layer from a cylinder surface is regarded as operable connecting surface. Also, the connecting surface between the top part and body part of the piston is one such operable connection surface. There may be more, depending the actual structure of the piston.

Also, in this context the feature that surface pattern of the micro geometry is isotropic means that the surface is in planar direction similar in both directions of the plane of surface. An axial direction of the piston is here the direction of the movement when the piston is in operation. Pistons are normally circular or near circular and thus the axial direction is parallel to the center axis of that circle.

Regarding the macro geometry of wavy surface, a length of a wave can be measured for example from a crest of a wave to the crest of the adjacent wave. Similarly, a height of a wave can be measured from bottom of the wave perpendicular to line segment connecting two adjacent crests of waves.

BRIEF DESCRIPTION OF THE DRAWINGS

The invention is hereinafter explained in more detail in connection with enclosed figures wherein.

DETAILED DESCRIPTION OF THE PREFERRED EMBODIMENTS

Figure 1:
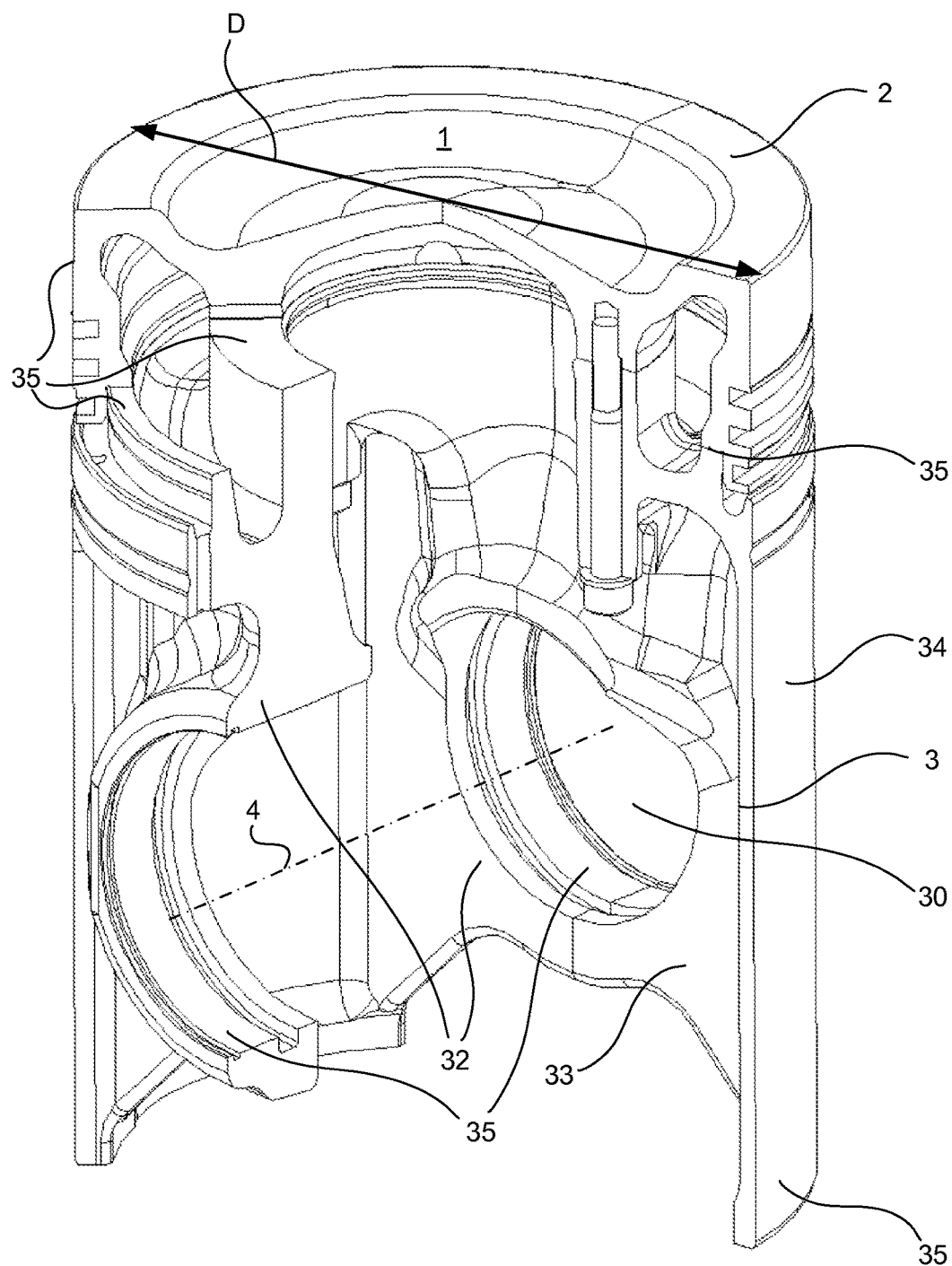
FIG. 1 presents a general overview and partial cross section of a piston.

In FIG. 1 it is presented a piston 1 for internal combustion diesel engine having a piston diameter D of 180 to 650 mm, the piston 1 comprising a top part 2 and a body part 3 connected to each others, the top part 2 defining, when installed in a cylinder of the engine, the piston side of a combustion chamber, and the body part 3 having an aperture 30 for a gudgeon pin 4 (not shown, only position is illustrated), bosses 32 for distributing forces, when in use, between the piston 1 and the gudgeon pin, the body part 3 having an interior 33, an outer surface 34 and operable connecting surfaces 35. For illustrative purposes the piston 1 is presented here as partially cross sectioned so that the different parts can be visualised easier.

Figure 2:
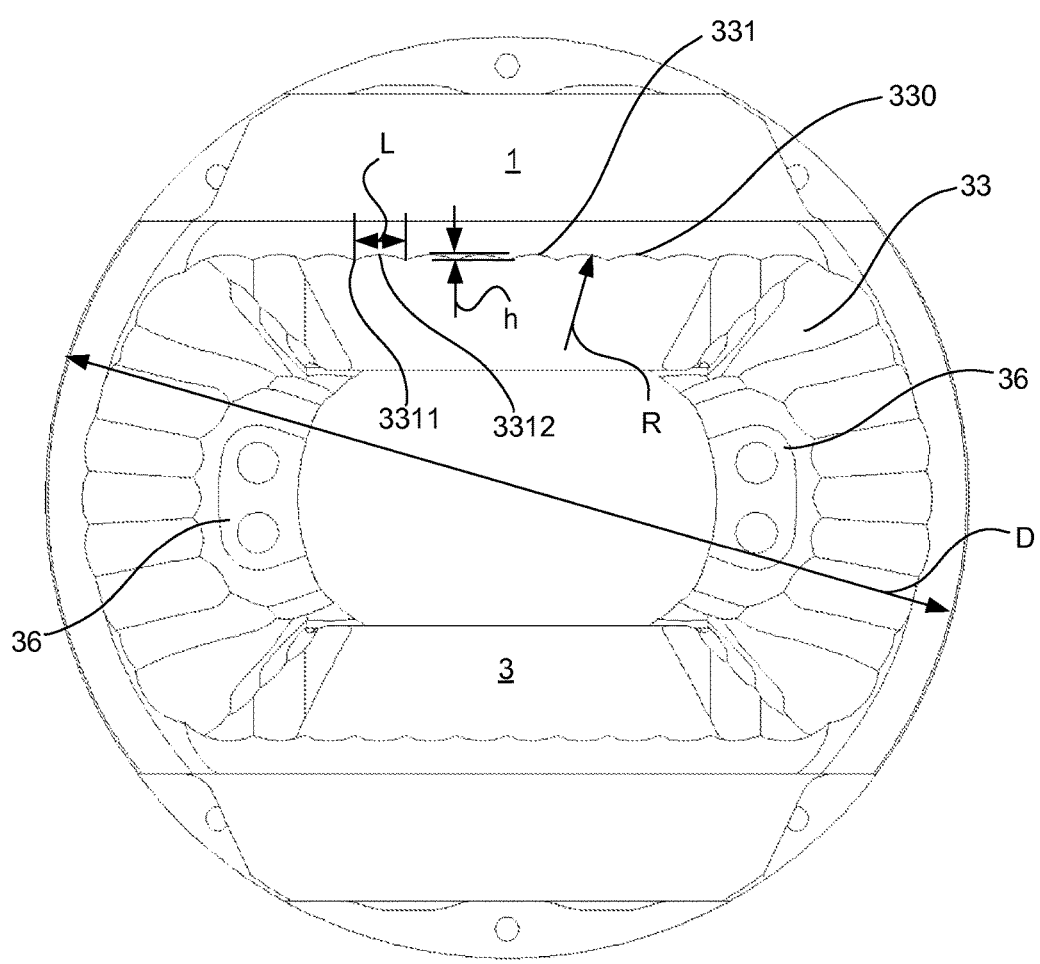
FIG. 2 presents more detailed view of a piston body part interior.

In FIG. 2 it is presented a body part 3 of a piston 1 so that the interior of the body part can be seen. The interior 33 of the body part 3 comprises an interior wall 330 (or surface) having a macro geometry of wavy surface 331, where a length L of a wave 331 is 3 to 25 mm and a height h of a wave 331 is 0.3 to 3 mm, the wavy surface 331 having a micro geometry measurable as a surface roughness of 5 to 9 µm $R_a$ i.e. arithmetic average of surface roughness.

According to an embodiment of the piston 1 when the diameter D of the piston 1 is 180 to 300 mm, the wave 331 length L is 3 to 15 mm and the wave 331 height h is 0.3 to 1.0 mm. Still according to an embodiment, when the diameter D of the piston 1 is above 300 mm, the wave 331 length L is substantially more than 15 mm and the wave height h is more than 1.0 mm. However, in certain areas, such as by the bosses 32 or by the domes 36, the wave length L may be also smaller than said 15 mm, even converge to zero. This enables the waves 331 to be very suitable in size compared to overall size of the piston 1 and simultaneously manufacturability remains at acceptable level. In the embodiment of FIG. 2 the domes 36 are formed as a surfaces for fastening means, such as bolts, to attach the top part of piston to the body part 3 of the piston.

Figure 3:
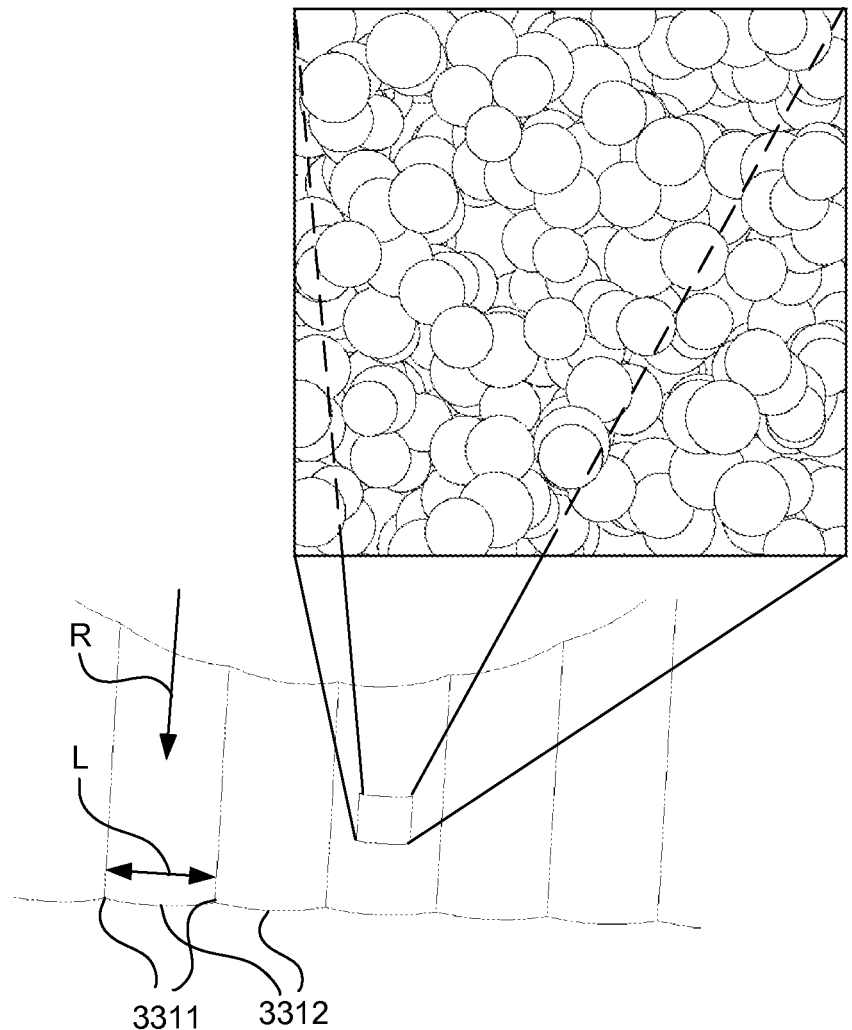
FIG. 3 presents an embodiment of wavy geometry in the interior of the body part and an embodiment of micro geometry as an illustrated microscopic image.

Regarding the macro geometry of wavy surface the measures of waves can be determined in a conventional manner as show in FIG. 2 and/or FIG. 3. A length L of a wave can be measured for example from a crest 3311 of a wave to the crest 3311 of the adjacent wave. Similarly a height h of a wave can be measured from bottom 3312 of the wave perpendicularly to line segment connecting two adjacent crests 3311 of waves.

At FIG. 3 (and FIG. 2) it is presented one embodiment of the piston interior wherein the radius R of a wave is 10 to 30 mm, preferably 12.5 to 25 mm. Radius R of the wave is one factor which may affect the resistance of a surface against an initiation of the crack or initial crack to grow.

FIG. 3 presents also an embodiment of micro geometry as an illustrated microscopic image (as an square enlargement in FIG. 3). In the image one may notice, that a surface pattern of the micro geometry is isotropic. This means that the surface of the body part interior comprises a pattern, which is in the plane of the surface substantially similar in both directions. This isotropic surface pattern is obtainable for example by shot peening or shot blasting. The effect of this feature is to make the surface even so that there are no orientated markings caused by previous manufacturing phases such as the milling of the macro geometry. In addition those mentioned finishing methods cause a significant compressive stress to the very surface of the interior of the body part and therefore also effecting positively to the fatigue resistance of the piston.

Surface roughness range has an effect to the fatigue resistance. If the surface is too rough, it may have already those spots for initial crack to grow. If the surface is such that it has small but sharp oriented markings from for example milling operation, it may therefore not be enough fatigue resistant. In studies conserving an optimal surface for the purpose of fatigue resistance the applicant has noticed, that the optimum isotropic surface roughness lies in the range of 5 to 9 µm measured as $R_a$ i.e. arithmetic average of surface roughness.

Figure 4:
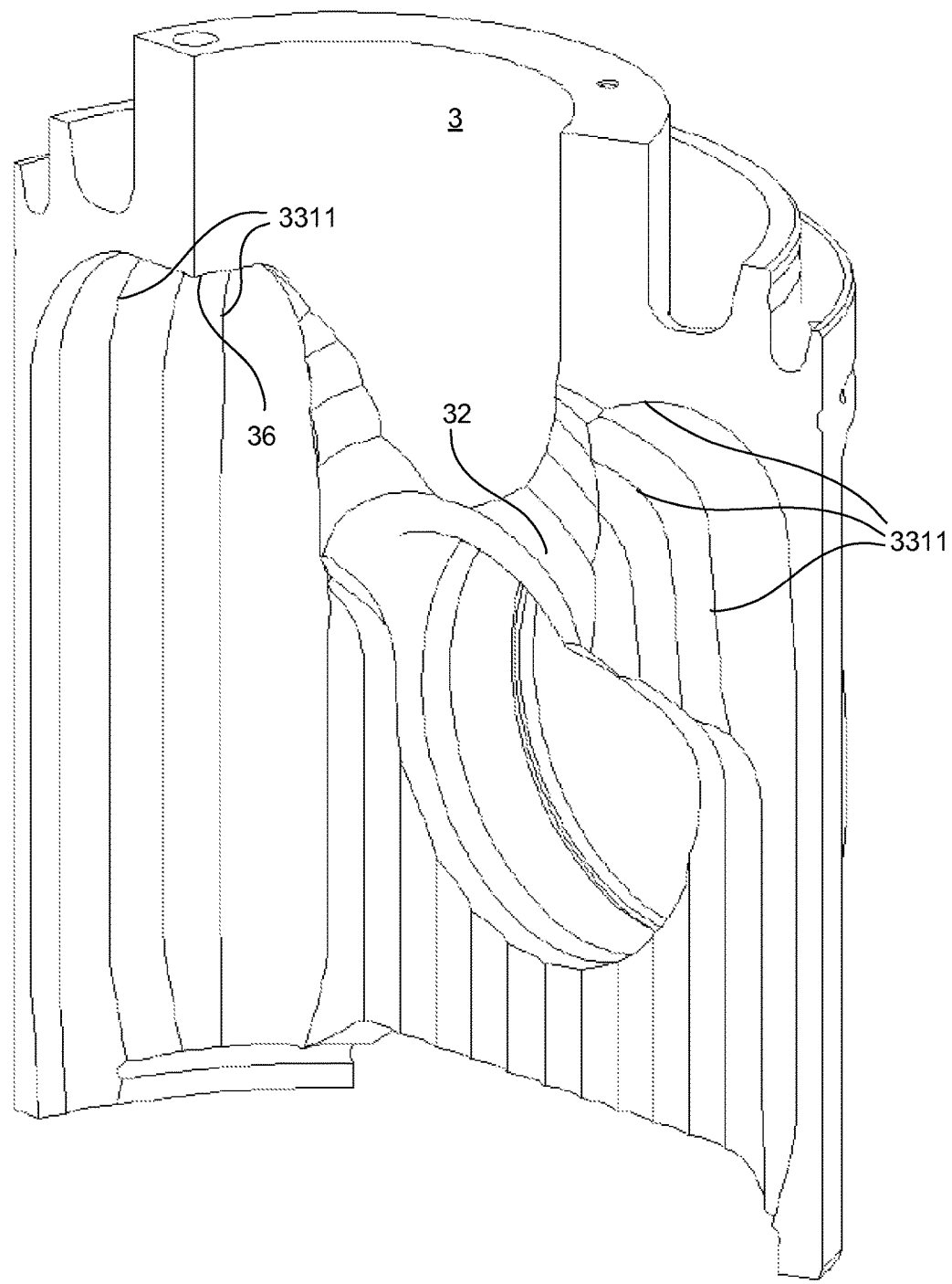
FIG. 4 presents an embodiment of wavy geometry at the interior of the body part and a boss.

In FIG. 4 is it presented an embodiment of wavy geometry at the boss or bosses 32. By the bosses 32 a crest 3311 of the wave point to a dome 36 or domes of the interior. The interior of the body part is preferably designed so that there are no small radius corners or like, but rather large radius curves and turns. One particular shape is a dome like shape. If the top part of the piston is attachable by number of bolts from the interior of the body part, it is preferred to shape the interior in such a way that there is dome like shape for each bolt attachment position. To make the interior wall as resistive as possible agains an initial crack caused by the alternating stress, the wavy surface is shaped so that those waves converges towards the top of the dome. Also, it can be noted in FIG. 4 that the wavy surface is directed in the interior wall such that a majority of the crests 3311 of the waves is in an axial direction of the piston.

One manufacturing method for producing a piston as described above is mentioned below. A piston blank is formed by casting or forging. The piston blank comprises an overall geometry that is rather close to the final, ready to operate, geometry of the piston, but it still comprises manufacturing clearances all over the piston in such a way that substantially all the surfaces are machined before the piston is completed. That interior of the piston body part is machined (such as by plunge milling) with an axial milling tool so that the milling path is selected so that the macro geometry as claimed is achieved. In one preferred embodiment, a machining head of 50 mm in diameter (giving a radius R of 25 mm for the wave) is selected and it is programmed so (path of the tool in a numerically controlled (NC) milling machine) that the referred macro geometry is achieved. After the macro geometry is milled, the body part of the piston is shot peened or shot blasted so that the micro geometry as claimed is achieved in the interior of the body part. Preferably those operable connecting surfaces are not shot peened or shot blasted.

REFERENCES USED IN FIGURES

1 Piston
D piston diameter
2 top part
3 body part
30 aperture
32 boss
33 interior
330 interior wall
331 wave, wavy surface 3311 crest of a wave
3312 bottom of a wave
L length of a wave
h height of a wave
R radius of a wave
34 outer surface
35 operable connecting surface
36 dome
4 gudgeon pin

The invention claimed is:

1. A piston (1) for an internal combustion diesel engine having a piston diameter (D) of 180 to 650 mm, the piston (1) comprising: a top part (2); and a body part (3) connectable to the top part, the top part (2) defining, when installed in a cylinder of the engine, a piston side of a combustion chamber, and the body part (3) having an interior (33), an outer surface (34), and an operable connecting surface (35) for connecting an upper part of the body part (3) to the top part (2), the body part (3) also having an aperture (30) for a gudgeon pin (4), and bosses (32) configured for distributing forces, when in use, between the piston (1) and the gudgeon pin (4), the interior (33) of the body part (3) comprising an inward-facing interior wall (330) having a macro geometry of an inward-facing wavy (331) surface constituted by a plurality of adjoining waves (331), each in the form of a concave trough, a line along which each wave adjoins an adjacent wave forming an edge pointing toward the interior of the body part (3), a length (L) of the plurality of adjoining waves (331) of the inward-facing wavy surface being 3 to 25 mm and a height (h) of plurality of adjoining the waves (331) being 0.3 to 3 mm, the inward-facing wavy surface having an isotropic micro geometry comprising a pattern, which is substantially similar in both directions of the plane of surface and which isotropic surface pattern is formed by shot peening or shot blasting, and the isotropic micro geometry pattern is measurable as an arithmetic average of surface roughness of 5 to 9 μm.

2. The piston (1) of claim 1, wherein the inward-facing wavy surface is directed in the inward-facing interior wall such that the edges of the plurality of adjoining waves extend along an axial direction of the piston (1).

3. The piston (1) of claim 1, wherein by the bosses, the edges of the plurality of adjoining waves point to a dome or domes (36) of the interior.

4. The piston (1) of claim 2, wherein by the bosses the edges of the plurality of adjoining waves point to a dome or domes (36) of the interior.

5. The piston (1) of claim 1, wherein when the diameter (D) of the piston is 180 to 300 mm, the wave length (L) is 3 to 15 mm and wave height (h) is 0.3 to 1.0 mm.

6. The piston (1) of claim 1, wherein when the diameter (D) of the piston is above 300 mm, the wave length (L) is substantially more than 15 mm and wave height (h) is more than 1.0 mm.

7. The piston (1) of claim 1, wherein a radius (R) of the wave is 10 to 30 mm.

8. The piston (1) of claim 7, wherein the radius (R) of the wave is 12.5 to 25 mm.

9. The piston of claim 1, wherein the inward-facing interior wall (330) of the body part (3) comprises a surface layer having compressive stress.

10. A piston (1) for an internal combustion diesel engine having a piston diameter (D) of 180 to 650 mm, the piston (1) comprising: a top part (2) that, when the piston (1) is installed in a cylinder of the engine, defines the piston (1) side of a combustion chamber; and a body part (3) connectable to the top part (2), the body part (3) having i) an aperture (30) for a gudgeon pin (4), ii) bosses (32) for distributing forces, when in use, between the piston (1) and the gudgeon pin (4), iii) an interior (33), and iv) an outer surface (34) and v) operable connecting surfaces (35), wherein the interior (33) of the body part (3) comprises an interior wall (330) having a macro geometry of an inward-facing wavy (331) surface, said inward-facing wavy surface constituted by a plurality of adjoining waves (331) each in the form of a concave trough, each wave adjoining an adjacent wave along a line that forms an edge pointing toward the interior of the body part (3), and wherein the inward-facing wavy surface has an isotropic micro geometry comprising a pattern, which is substantially similar in both directions of the plane of surface.

11. The piston (1) of claim 1, wherein edges of the plurality of adjoining waves located by the bosses each point toward a dome structure located at an upper location of the interior of the body part (3).

12. The piston (1) of claim 11, wherein the plurality of adjoining waves that are located by the bosses converge at a location of the bosses so as to have lengths that are smaller than the length of the plurality of adjoining waves at a remainder of the inward-facing wavy surface.

13. The piston (1) of claim 11, wherein a length of the plurality of adjoining waves that are located by the dome structure are smaller than the length of the plurality of adjoining waves at a remainder of the inward-facing wavy surface.

14. The piston (1) of claim 11, wherein the plurality of adjoining waves that are located by the dome structure converge at a location of the bosses so as to have lengths that are smaller than the length of the plurality of adjoining waves at a remainder of the inward-facing wavy surface.

15. The piston (1) of claim 11, wherein lengths of the plurality of adjoining waves that are located by the bosses are smaller than the lengths of the plurality of adjoining waves at a remainder of the inward-facing wavy surface.

16. The piston of claim 10, wherein a length (L) of a wave (331) is 3 to 25 mm and a height (h) of the wave (331) is 0.3 to 3 mm.

17. The piston of claim 10, wherein the pattern of the isotropic micro geometry of the inward-facing wavy surface is measurable as an arithmetic average of surface roughness of 5 to 9 pm.

* * * * *